United States Patent
Hayashi et al.

(10) Patent No.: US 10,953,364 B2
(45) Date of Patent: Mar. 23, 2021

(54) METHOD FOR SEPARATING CARBON DIOXIDE AND APPARATUS FOR SEPARATING CARBON DIOXIDE

(71) Applicant: MITSUBISHI CHEMICAL CORPORATION, Chiyoda-ku (JP)

(72) Inventors: Mikio Hayashi, Chiyoda-ku (JP); Takahiko Takewaki, Chiyoda-ku (JP); Nobuhiko Ueno, Chiyoda-ku (JP)

(73) Assignee: MITSUBISHI CHEMICAL CORPORATION, Chiyoda-ku (JP)

(*) Notice: Subject to any disclaimer, the term of this patent is extended or adjusted under 35 U.S.C. 154(b) by 0 days.

(21) Appl. No.: 16/120,861

(22) Filed: Sep. 4, 2018

(65) Prior Publication Data

US 2018/0369746 A1 Dec. 27, 2018

Related U.S. Application Data

(63) Continuation of application No. PCT/JP2017/008666, filed on Mar. 6, 2017.

(30) Foreign Application Priority Data

Mar. 4, 2016 (JP) .............................. JP2016-042129

(51) Int. Cl.
*B01D 53/22* (2006.01)
*B01D 67/00* (2006.01)
(Continued)

(52) U.S. Cl.
CPC ......... *B01D 53/22* (2013.01); *B01D 67/0051* (2013.01); *B01D 71/028* (2013.01);
(Continued)

(58) Field of Classification Search
CPC ...... B01D 53/22; B01D 53/228; B01D 63/06; B01D 71/02; B01D 71/028; B01D 2257/504; C10L 3/104; C10L 2290/548
See application file for complete search history.

(56) References Cited

U.S. PATENT DOCUMENTS 5,976,220 A * 11/1999 Braun .................. B01D 53/228
 55/385.2
2006/0011535 A1 * 1/2006 Ikeda .................... B01D 63/06
 210/321.79

(Continued)

FOREIGN PATENT DOCUMENTS

JP 2001-505816 A 5/2001
JP 2007-160238 6/2007
(Continued)

OTHER PUBLICATIONS

Office Action dated Jul. 22, 2019 in Cooperation Council for the Arab States of the Gulf Patent Application No. GC 2017-33015 (with English translation), 7 pages.
(Continued)

*Primary Examiner* — Jason M Greene
(74) *Attorney, Agent, or Firm* — Oblon, McClelland, Maier & Neustadt, L.L.P.

(57) ABSTRACT

The present invention addresses the problem of providing a technology for efficiently separating carbon dioxide in a method for separating carbon dioxide from a mixed gas by using a membrane separation method. The problem is solved by a method including supplying a mixed gas to a separation membrane module to separate carbon dioxide from the mixed gas, in which the mixed gas is supplied to the separation membrane module at a high linear velocity in order to sufficiently mix a mixed gas in the vicinity of a membrane.

18 Claims, 5 Drawing Sheets

(51) Int. Cl.
*C10L 3/10* (2006.01)
*B01D 71/02* (2006.01)

(52) U.S. Cl.
CPC ............ *C10L 3/104* (2013.01); *B01D 53/228* (2013.01); *B01D 2256/245* (2013.01); *B01D 2257/504* (2013.01); *B01D 2323/12* (2013.01); *C10L 2290/548* (2013.01); *Y02C 20/40* (2020.08)

(56) References Cited

U.S. PATENT DOCUMENTS

| | | | |
|---|---|---|---|
| 2008/0216650 A1* | 9/2008 | Falconer | B01D 53/228 95/51 |
| 2010/0090165 A1* | 4/2010 | Bratton | B01D 71/028 252/364 |
| 2014/0190146 A1* | 7/2014 | Fujita | B01D 53/22 60/39.465 |
| 2017/0327758 A1 | 11/2017 | Tanaka et al. | |
| 2017/0348643 A1 | 12/2017 | Noguchi et al. | |
| 2018/0178166 A1* | 6/2018 | Okubo | B01D 53/228 |

FOREIGN PATENT DOCUMENTS

| | | |
|---|---|---|
| JP | 2010-247107 | 11/2010 |
| JP | 2011-230036 | 11/2011 |
| JP | 2012-066242 | 4/2012 |
| JP | 2016-108418 | 6/2016 |
| WO | WO 2012/147618 A1 | 11/2012 |
| WO | WO 2016/027713 A1 | 2/2016 |
| WO | WO 2016/136846 A1 | 9/2016 |

OTHER PUBLICATIONS

International Preliminary Report on Patentability and Written Opinion dated Sep. 13, 2018 in PCT/JP2017/008666 (submitting English translation only), 10 pages.
Gulf Cooperation Council Office Action dated Mar. 11, 2019 in GCC Application No. 2017/33015 (with partial English translation), 7 pages.
International Search Report dated Apr. 11, 2017 in PCT/JP2017/008666 filed Mar. 6, 2017 (with English Translation).
Adolfo M. Avila, et al., "Concentration polarization in SAPO-34 membranes at high pressures," Journal of Membrane Science 335, 2009, pp. 32-36.
Xuezhong He, et al., "Hybrid fixed-site-carrier membranes for $CO_2$ removal from high pressure natural gas: Membrane optimization and process condition investigation," Journal of Membrane Science 470, 2014, pp. 266-274.
Office Action as received in the corresponding Indonesian Patent Application No. PID201807846, dated Aug. 10, 2020 w/English translation, 4 pages.
Office Action dated Dec. 1, 2020 in corresponding Japanese Application No. 2018-503439 (w/ Machine Translation), 14 pages.

* cited by examiner

METHOD FOR SEPARATING CARBON DIOXIDE AND APPARATUS FOR SEPARATING CARBON DIOXIDE

CROSS-REFERENCE TO RELATED APPLICATION

This is a continuation of International Application PCT/JP2017/008666, filed on Mar. 6, 2017, and designated the U.S., and claims priority from Japanese Patent Application 2016-042129 which was filed on Mar. 4, 2016, the entire contents of which are incorporated herein by reference.

TECHNICAL FIELD

The present invention relates to a method for separating carbon dioxide from a mixed gas containing carbon dioxide. Further, the present invention relates to an apparatus for separating carbon dioxide from a mixed gas containing carbon dioxide.

BACKGROUND ART

Examples of methods for separating and concentrating gases include a membrane separation method, an adsorption separation method, an absorption separation method, a distillation separation method, and a cryogenic separation method. The membrane separation method is a technique in which a phase change is hardly induced during separation, and the separation is caused by a difference between the velocities of gases that permeate a membrane with a difference in pressure as drive energy. Separation by adsorption/absorption requires a step of desorbing an adsorbed/absorbed gas, and becomes batch treatment. Therefore, plural units are required for allowing the separation to be a continuous process. However, in the membrane separation method, continuous separation is possible, and a facility scale can be made to be relatively small. In the distillation/cryogenic separation methods, a phase change is induced in separation, and a large amount of energy is required although continuous treatment is possible. However, in the membrane separation method, energy-saving separation with a difference in pressure as drive force is possible.

Since the 1970s, methods using polymer membranes have been proposed as methods for separating gases by membranes. However, although the polymer membranes have had characteristics of being excellent in processability, the polymer membranes have had problems that deterioration and reduction in performance are caused by heat, chemical substances, and pressure, and have been insufficient in view of usable condition ranges.

Inorganic membranes having favorable chemical resistance, oxidation resistance, heat resistance, and pressure resistance have been proposed in order to solve the problems. Examples of the inorganic membranes include: dense membranes such as Pd membranes and composite oxide membranes; and porous membranes such as silica membranes and zeolite membranes. Separation by the dense membranes is based on the principle of solution-diffusion while separation by the porous membrane uses molecular sieving and adsorptivity. The membranes can be directed at separating even components that do not dissolve in the membranes, from each other. Among them, the zeolite membranes have uniform pore diameters, high molecular-sieve effects, and excellent separation performance because of having crystallinity and subnanometer regular pores. Adsorptivity can also be expected to be controlled by changing the composition thereof. Further, the zeolite membranes are crystalline, and therefore have excellent stability in comparison with the silica membranes and the like which have amorphous forms.

As a method for separating a gas with the use of a membrane separation method, there has been disclosed a method of making a structure in which a partition wall is disposed in the housing of a separation module to partition the housing into at least two or more spaces, circulation pores for enabling a gas to move between the spaces into which the housing is partitioned exist in the partition wall, and both high-pressure-side gas flow and low-pressure-side permeate gas flow in a membrane put in the two or more spaces can move in series over a distance two or more times the effective length of the membrane and can come in contact with the membrane, whereby the original separation performance of the membrane can be exhibited (see Patent Literature 1).

As a method for operating a gas separation apparatus capable of separating a gas with a high separation ability and a high treatment ability, there has also been disclosed a method in which in a module including plural separation membrane modules, the separation membrane modules are operated to place a predetermined interval between the cycle of operating one separation membrane module and the cycle of operating another separation membrane module just before the cycle (see Patent Literature 2).

In contrast, a method using a SAPO-34 membrane having high permeability has been known as a method for separating carbon dioxide from a mixed gas. It has been disclosed to insert a spacer made of Teflon (registered trademark) into a membrane pipe because permeability at a feed pressure of 1 MPa or more is greatly affected by concentration polarization (see Non Patent Literature 1).

A method for selectively separating $CO_2$ from a $CO_2/CH_4$ mixed gas by using a hybrid FSC membrane has been known. It has been disclosed that the hybrid FSC membrane prepared under optimal conditions exhibits high $CO_2$ permeability and relatively favorable $CO_2/CH_4$ selectivity in a gas permeation test at high pressure (see Non Patent Literature 2).

CITATION LIST

Patent Literature

[Patent Literature 1] Japanese Patent Laid-Open No. 2007-160238
[Patent Literature 2] Japanese Patent Laid-Open No. 2011-230036

Non Patent Literature

[Non Patent Literature 1] Adolfo M. Avila et al. Concentration polarization in SAPO-34 membranes at high pressures, Journal of Membrane Science 335 (2009) 32-36
[Non Patent Literature 2] Xuezhong He et al. Hybrid fixed-site-carrier membranes for $CO_2$ removal from high pressure natural gas: Membrane optimization and process condition investigation, Journal of Membrane Science 470 (2014) 266-274

SUMMARY OF INVENTION

Technical Problem

The methods for separating carbon dioxide from mixed gases by using the membrane separation methods disclosed in the Non Patent Literatures 1 and 2 described above have been susceptible to improvement although having been able to achieve certain $CO_2$ separation performance.

The present invention addresses the problem of providing a technology for further efficiently separating carbon dioxide in a method for separating carbon dioxide from a mixed gas by using a membrane separation method.

Solution to Problem

As a result of intensive examination for solving the above-described problem, the present inventors found that $CO_2$ separation performance through a separation membrane depends on the linear velocity of a mixed gas supplied to the separation membrane. In particular, it was found that the setting of the linear velocity of a mixed gas to a degree in a particular range or more is required for sufficiently exhibiting separation performance when the mixed gas is supplied in a turbulent state having a Reynolds number of 2300 or more, or when a separation membrane having high separation performance is used, and the present invention was accomplished.

In other words, the gist of the present invention is as follows.

(1) A method for separating carbon dioxide, the method including supplying a mixed gas to a separation membrane module to separate carbon dioxide from the mixed gas, wherein the mixed gas is supplied to the separation membrane module at a Reynolds number of 2300 or more and a linear velocity of 1.0 m/s or more.

(2) A method for separating carbon dioxide, the method including supplying a mixed gas to a separation membrane module to separate carbon dioxide from the mixed gas, wherein the separation membrane module includes an inorganic separation membrane as a separation membrane, and the mixed gas is supplied to the separation membrane module at a linear velocity of 1.0 m/s or more.

(3) The method for separating carbon dioxide according to (1) or (2), wherein a supply pressure of the mixed gas is 1 MPaG or more.

(4) The method for separating carbon dioxide according to any one of (1) to (3), wherein the separation membrane module includes a zeolite separation membrane as a separation membrane.

(5) An apparatus for separating carbon dioxide, the apparatus including a separation membrane module, wherein a mixed gas is supplied to the separation membrane module under conditions of a Reynolds number of 2300 or more and a linear velocity of 1.0 m/s or more.

(6) An apparatus for separating carbon dioxide, the apparatus including a separation membrane module, wherein the separation membrane module includes an inorganic separation membrane as a separation membrane, and a mixed gas is supplied to the separation membrane module under a condition of a linear velocity of 1.0 m/s or more.

Advantageous Effects of Invention

In accordance with the present invention, there can be provided a technology for efficiently separating carbon dioxide in a method for separating carbon dioxide from a mixed gas by using a membrane separation method.

DESCRIPTION OF EMBODIMENTS

Figure 1:
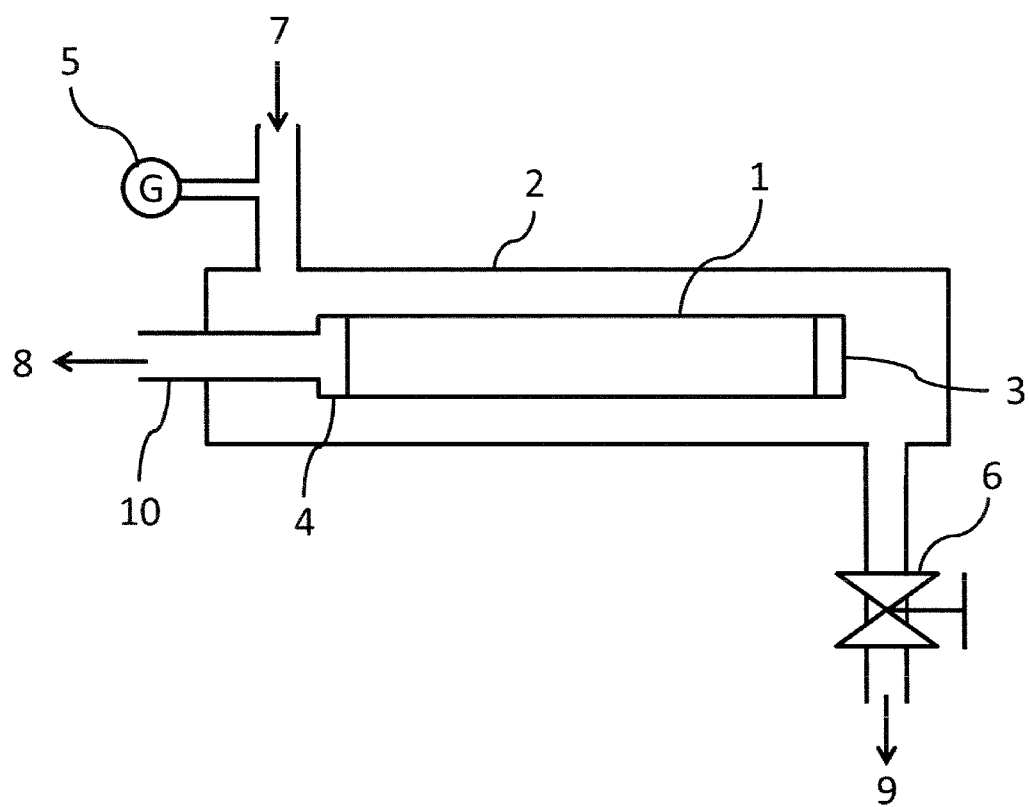
FIG. 1 is a schematic view of a separation membrane module including a zeolite membrane composite used in Examples.

Embodiments of the present invention will be described in detail below. The description of constituent features described below is an example (representative example) of the embodiments of the present invention, the present invention is not limited to the contents thereof unless deviating from the gist of the present invention, and various modifications can be made and carried out.

The present invention includes a method for separating carbon dioxide and an apparatus for separating carbon dioxide.

The method for separating carbon dioxide is a method including supplying a mixed gas to a separation membrane module to separate carbon dioxide from the mixed gas. The apparatus for separating carbon dioxide is a separation apparatus including the separation membrane module.

<Separation Membrane Module>

The separation membrane module includes a separation membrane, and is a module for separating carbon dioxide from a mixed gas containing carbon dioxide.

The size and number of such separation membranes included in the module are not particularly limited but can be set as appropriate according to the amount and components of the mixed gas from which the separation is performed, the kind of the separation membranes, and the like.

Examples of the separation membranes include: polymer membranes; and inorganic membranes such as Pd membranes, carbon membranes, silica membranes, and zeolite membranes. The inorganic membranes are preferred from the viewpoint of chemical resistance, oxidation resistance, heat resistance, pressure resistance, and the like.

The method for separating carbon dioxide according to an embodiment of the present invention can exhibit a high effect particularly when a separation membrane having high separation performance is used. The separation membrane having high separation performance specifically refers to a separation membrane having the high permeance ratio of carbon dioxide.

A permeance (also referred to as "permeation rate") is obtained by dividing the amount of a permeating substance by the product of a membrane area, a time, and a difference between partial pressures in the supply and permeation sides of the permeating substance, and the unit of the permeance is $[mol \cdot (m^2 \cdot s \cdot Pa)^{-1}]$. When the mixed gas containing carbon dioxide is a mixed gas containing carbon dioxide and methane, a separation membrane having a permeance ratio between single components of carbon dioxide and methane, measured at 50° C., a supply side gas pressure of 0.1 MPaG, and a permeation side gas pressure set at atmospheric pressure, of typically 100 or more, preferably 140 or more, and more preferably 180 or more is used. The upper limit of the permeance ratio is not particularly limited but is typically 500 or less.

Such a separation membrane having high separation performance is preferably an inorganic membrane, more preferably a carbon membrane or a zeolite membrane from the viewpoint of having high separation performance, and still more preferably a zeolite membrane.

As the carbon membrane, a known carbon membrane can be used as appropriate, and a carbon membrane produced by forming an organic polymer membrane and thereafter sintering the organic polymer membrane, or the like can be used. In a specific example, a polyimide which is an organic polymer is dissolved in an arbitrary solvent to produce a membrane production stock solution, and a solvent that is mixed with a solvent of the membrane production stock solution and is insoluble in a polyimide is prepared. Then, the membrane production stock solution and the solvent are simultaneously extruded from the peripheral ring-shaped port of a hollow fiber spinning nozzle having a double-pipe structure and the central circular port of the spinning nozzle, respectively, into a coagulation liquid, and molded into a hollow fiber form to produce an organic polymer membrane. Then, the obtained organic polymer membrane is subjected to infusibility treatment and thereafter carbonized, whereby a carbon membrane can be produced.

The carbon membrane may be a carbon membrane applied to a porous support. Examples of the porous support include ceramic alumina, silica, zirconia, magnesia, zeolite, and metallic filters.

Examples of the organic polymer which is a raw material of the carbon membrane include polyimides (aromatic polyimides), polyphenylene oxide (PPO), polyamides (aromatic polyamides), polypropylene, polyfurfuryl alcohol, polyvinylidene chloride (PVDC), phenolic resin, cellulose, lignin, polyetherimide, and cellulose acetate.

As the zeolite membrane, a known zeolite membrane can be used as appropriate, and a zeolite membrane formed on an inorganic porous support can be used. In the present specification, the inorganic porous support and the zeolite membrane formed thereon may be referred to as "zeolite membrane composite", which may be abbreviated as "membrane composite". Further, "inorganic porous support" may be abbreviated as "porous support" or "support".

The porous support may be any porous support as long as being a support having chemical stability capable of crystallizing a zeolite in a membranous form on a surface thereof or the like, and including an inorganic porous material (inorganic porous support). Examples thereof include: ceramic sintered bodies (ceramic supports) such as silica, α-alumina, γ-alumina, mullite, zirconia, titania, yttria, silicon nitride, and silicon carbide; sintered metals such as iron, bronze, and stainless steel; glass; and carbon molded products.

Among the porous supports, an inorganic porous support (ceramic support) including a material obtained by sintering ceramic which is a solid material of which the fundamental component or major portion includes an inorganic non-metallic substance is preferred. Use of the support has the effect of making part of the support into a zeolite during synthesizing a zeolite membrane, thereby enhancing the adhesiveness of an interface.

Specific examples thereof include ceramic sintered bodies (ceramic supports) including silica, α-alumina, γ-alumina, mullite, zirconia, titania, yttria, silicon nitride, silicon carbide, and the like. Among them, inorganic porous supports including at least one of alumina, silica, and mullite are preferred. Use of the supports facilitates partial making of a zeolite, therefore allows the supports and zeolite to be firmly bonded, and facilitates formation of membranes that are dense and have high separation performance.

The shape of the porous support is not particularly limited as long as being capable of effectively separating the mixed gas. Specific examples thereof include flat shapes, the shapes of pipes such as cylindrical pipes, the shapes of honeycombs in which a large number of cylindrically-shaped, column-shaped, and prism-shaped pores exist, and monoliths. A zeolite membrane composite is made by forming a zeolite in a membranous form on such a porous support, i.e., on a surface of the support, or the like. The surface of the support may be any surface according to the shape of the support, and may be plural faces. For example, in the case of a cylindrical pipe support, the surface may be an outer or inner surface, and may be both the outer and inner surfaces in some cases.

The average pore diameter in the porous support surface is not particularly limited. However, it is preferable to control pore diameters. The average pore diameter in the support surface is typically 0.02 μm or more, preferably 0.05 μm or more, and more preferably 0.1 μm or more, and typically 20 μm or less, preferably 10 μm or less, and more preferably 5 μm or less. The excessively small average pore diameter tends to result in a reduced permeation amount while the excessively large average pore diameter tends to result in the insufficient strength of the support in itself, the increased rate of pores in the support surface, and inhibition of formation of a dense zeolite membrane.

The average thickness (wall thickness) of the porous support is typically 0.1 mm or more, preferably 0.3 mm or more, more preferably 0.5 mm or more, and still more preferably 0.8 mm or more, and typically 7 mm or less, preferably 5 mm or less, and more preferably 3 mm or less. The support is used for the purpose of imparting mechanical strength to the zeolite membrane. However, the excessively small average thickness of the support tends to result in the insufficient strength of the zeolite membrane composite and in the vulnerability of the zeolite membrane composite to impact, vibration, and the like. The excessively large average thickness of the support tends to result in the deteriorated diffusion of a permeating substance and in a decreased permeation rate.

The porosity of the porous support is typically 20% or more, preferably 25% or more, and more preferably 30% or more, and typically 70% or less, preferably 60% or less, and more preferably 50% or less. A permeation flow volume in separation of a gas depends on the porosity of the support. The porosity that is less than the lower limit tends to result in inhibition of diffusion of a permeate while the porosity that is more than the upper limit tends to result in reduction in the strength of the support.

A surface of the porous support may be polished with a file or the like as needed. The surface of the porous support means a surface portion of the inorganic porous support, on which a zeolite is crystallized. The surface may be any surface of each shape as long as being a surface, and may be plural faces. For example, in the case of a cylindrical tube support, the surface may be an outer or inner surface, and may be both the outer and inner surfaces in some cases.

In addition to a zeolite, an inorganic binder such as silica or alumina, an organic compound such as a polymer, such a Si compound which modifies a zeolite surface as described in detail below or a reactant thereof, or the like may be included as a component included in the zeolite membrane, as needed. Although an amorphous component may be partly included, a zeolite membrane consisting essentially of a zeolite is preferred.

The thickness of the zeolite membrane is not particularly limited but is in the range of typically 0.1 μm or more, preferably 0.6 μm or more, more preferably 1 μm or more, and still more preferably 2 μm or more, and typically 100 μm or less, preferably 60 μm or less, and more preferably 20 μm or less. The excessively large membrane thickness tends to result in reduction in permeation amount while the excessively small membrane thickness tends to result in deterioration of selectivity and reduction in membrane strength.

Although the particle diameter of a zeolite is not particularly limited, the excessively small particle diameter tends to result in enlargement of a grain boundary, and the like, and in deterioration of permeation selectivity and the like. Therefore, the particle diameter is typically 30 nm or more, preferably 50 nm or more, and more preferably 100 nm or more, and the upper limit thereof is not more than the thickness of the membrane. Further, it is particularly preferable that the particle diameter of a zeolite is equal to the thickness of the membrane. When the particle diameter of the zeolite is equal to the thickness of the membrane, the grain boundary of the zeolite is the smallest. A zeolite membrane obtained by hydrothermal synthesis described later is particularly preferred because the particle diameter of a zeolite may be equal to the thickness of the membrane.

The shape of the zeolite membrane composite is not particularly limited, and any shape such as a tube shape, a hollow fiber shape, a monolith type, or a honeycomb type can be adopted. The size thereof is not particularly limited either. For example, in the case of a tube shape, its size having a length of typically 2 cm or more, preferably 20 cm or more, and typically 200 cm or less, an inner diameter of 0.05 cm or more and 2 cm or less, and a thickness of 0.5 mm or more and 4 mm or less is practical and preferable.

One of the separation functions of the zeolite membrane is separation as a molecular sieve, and is capable of preferably separating a gas molecule having a size that is not less than the effective pore diameter of a zeolite used and a gas having a size that is not more than the effective pore diameter from each other. There is no upper limit on a molecule subjected to the separation, and the size of the molecule is typically around 100 Å or less.

It is preferable that the zeolite included in the zeolite membrane is aluminosilicate. The $SiO_2/Al_2O_3$ molar ratio (SAR) of the zeolite membrane is preferably 5 or more, more preferably 8 or more, still more preferably 10 or more, particularly preferably 12 or more, and most preferably 20 or more, and preferably 2000 or less, more preferably 1000 or less, still more preferably 500 or less, still more preferably 100 or less, and particularly preferably 50 or less. The SAR of the membrane that is not less than the lower limit tends to result in improvement in durability while the SAR that is not more than the upper limit results in a merit that a permeation rate is not decreased in view of adsorptivity.

The SAR of the zeolite membrane is a numerical value obtained by scanning electron microscope-energy dispersive X-ray spectroscopy (SEM-EDX). In SEM-EDX, information only on a membrane of several microns of can be obtained by measurement at an X-ray acceleration voltage set at around 10 kV. Because the zeolite membrane is formed uniformly, the SAR of the membrane can be determined by the measurement.

With regard to the zeolite principally included in the zeolite membrane, a zeolite membrane including a zeolite having an oxygen 8- or less-membered ring pore structure is preferred, and a zeolite membrane including a zeolite having an oxygen 6- to 8-membered ring pore structure is more preferred.

The value of n of a zeolite having an oxygen n-membered ring as used herein exhibits a pore in which the number of oxygen atoms is the greatest among pores including oxygen that forms a zeolite framework and a T element (element other than oxygen included in a framework). For example, when oxygen 12-membered ring and 8-membered ring pores exist, like an MOR-type zeolite, the zeolite is regarded as a zeolite having an oxygen 12-membered ring.

Examples of the zeolite having an oxygen 8- or less-membered ring pore structure include AEI, AFG, ANA, BRE, CAS, CDO, CHA, DDR, DOH, EAB, EPI, ERI, ESV, FAR, FRA, GIS, GIU, GOO, ITE, KFI, LEV, LIO, LOS, LTN, MAR, MEP, MER, MEL, MON, MSO, MTF, MTN, NON, PAU, PHI, RHO, RTE, RTH, RUT, SGT, SOD, TOL, TSC, UFI, VNI, and YUG.

Examples of the zeolite having an oxygen 6- to 8-membered ring structure include AEI, AFG, ANA, CHA, EAB, ERI, ESV, FAR, FRA, GIS, ITE, KFI, LEV, LIO, LOS, LTN, MAR, PAU, RHO, RTH, SOD, TOL, and UFI.

In the present specification, zeolite structures are denoted by codes that are specified by the International Zeolite Association (IZA) and that define zeolite structures, as described above.

An oxygen n-membered ring structure determines the size of a pore in a zeolite. A zeolite that is smaller than an oxygen 6-membered ring has a pore diameter that is smaller than the kinetic diameter of a $H_2O$ molecule, and may therefore result in a decreased permeation rate and in unpracticalness. A zeolite that is larger than an oxygen 8-membered ring structure may result in an increased pore diameter, deterioration of separation performance in a gas component having a small size, and limited applications.

The framework density (T/1000 $Å^3$) of a zeolite is not particularly limited but is typically 17 or less, preferably 16 or less, more preferably 15.5 or less, and particularly preferably 15 or less, and typically 10 or more, preferably 11 or more, and more preferably 12 or more.

The framework density means the number of elements (T elements) other than oxygen included in a framework per 1000 $Å^3$ of a zeolite. The value of the framework density depends on a zeolite structure. A structural relationship between a framework density and a zeolite is described in ATLAS OF ZEOLITE FRAMEWORK TYPES Fifth Revised Edition 2001 ELSEVIER.

Preferred zeolite structures are AEI, AFG, CHA, EAB, ERI, ESV, FAR, FRA, GIS, ITE, KFI, LEV, LIO, LOS, LTN, MAR, PAU, RHO, RTH, SOD, TOL, and UFI, more preferred structures are AEI, CHA, ERI, KFI, LEV, PAU, RHO, RTH, and UFI, still more preferred structures are CHA and LEV, and the most preferred structure is CHA.

The CHA-type zeolite represents a zeolite having a CHA structure in codes that are specified by the International Zeolite Association (IZA) and that define zeolite structures. The zeolite is a zeolite having a crystal structure equivalent to the crystal structure of naturally occurring chabazite. The CHA-type zeolite includes a structure including a three-dimensional pore having a diameter of 3.8×3.8 Å and including an oxygen 8-membered ring, and the structure is characterized by X-ray diffraction data.

The framework density (T/1000 $Å^3$) of the CHA-type zeolite is 14.5. In addition, a $SiO_2/Al_2O_3$ molar ratio is similar to the above.

A method for producing a zeolite membrane composite is not particularly limited, but for example, a method of forming a zeolite on a porous support by hydrothermal synthesis is preferred.

Specifically, for example, a zeolite membrane composite can be prepared by putting a reaction mixture for hydrothermal synthesis (hereinafter may be referred to as "aqueous reaction mixture") homogenized by adjusting composition in a heat-resistant pressure-resistant container such as an autoclave, in which a porous support is loosely fixed, sealing the container, and heating the mixture for predetermined time.

It is preferable that the aqueous reaction mixture includes a Si element source, an Al element source, an alkali source, and water, and further includes an organic template as needed.

For example, amorphous silica, colloidal silica, silica gel, sodium silicate, silicate gel of amorphous aluminum, tetraethoxysilane (TEOS), trimethylethoxysilane, or the like can be used as the Si element source used in the aqueous reaction mixture.

For example, sodium aluminate, aluminum hydroxide, aluminum sulfate, aluminum nitrate, aluminum oxide, amorphous aluminosilicate gel, or the like can be used as the Al element source. In addition to the Al element source, another element source, for example, an element source such as Ga, Fe, B, Ti, Zr, Sn, or Zn may be included.

In crystallization of a zeolite, an organic template (structure-directing agent) can be used as needed. Synthesis by using the organic template results in the increased rate of silicon atoms to aluminum atoms in the crystallized zeolite, and in improvement in acid resistance and steam resistance.

Any kind of the organic template is acceptable and any organic template is acceptable as long as enabling a desired zeolite membrane to be formed. The template may be used singly, or in combination of two or more kinds thereof.

When the zeolite is a CHA type, an amine or a quaternary ammonium salt is typically used as the organic template. Preferred examples thereof include organic templates described in U.S. Pat. No. 4,544,538 and U.S. Patent Publication No. 2008/0075656.

A hydroxide ion as the counter anion of the organic template, an alkali metal hydroxide such as NaOH or KOH, an alkaline earth metal hydroxide such as $Ca(OH)_2$, or the like may be used as the alkali source used in the aqueous reaction mixture. The kind of the alkali is not particularly limited, but Na, K, Li, Rb, Cs, Ca, Mg, Sr, Ba, or the like is typically used. Among them, Li, Na, and K are preferred, and K is more preferred. The alkali may be used in combination of two or more kinds thereof. Specifically, it is preferable to use Na and K, or Li and K in combination. It is particularly preferable to use only Na and/or K as the alkali source.

The ratio between the Si element source and the Al element source in the aqueous reaction mixture is typically expressed as the molar ratio between oxides of the respective elements, i.e., a $SiO_2/Al_2O_3$ molar ratio. The $SiO_2/Al_2O_3$ molar ratio is not particularly limited, but is typically 5 or more, preferably 8 or more, more preferably 10 or more, and still more preferably 15 or more. Further, the $SiO_2/Al_2O_3$ molar ratio is typically 10000 or less, preferably 1000 or less, more preferably 300 or less, and still more preferably 100 or less.

The $SiO_2/Al_2O_3$ molar ratio in the range results in generation of a dense zeolite membrane, which becomes a membrane having high separation performance. Further, Al atoms moderately exist in the generated zeolite, and therefore, separation performance is improved in a gas component exhibiting adsorptivity to Al. When Al is in the range, a zeolite membrane with high acid resistance and high steam resistance is obtained.

As for the ratio between the silica source and the organic template in the aqueous reaction mixture, the molar ratio of the organic template to $SiO_2$ (organic template/$SiO_2$ molar ratio) is typically 0.005 or more, preferably 0.01 or more, and more preferably 0.02 or more, and typically 1 or less, preferably 0.4 or less, and more preferably 0.2 or less.

When the organic template/$SiO_2$ molar ratio is in the above-described range, a dense zeolite membrane can be generated, and the generated zeolite has high acid resistance and high steam resistance.

As for the ratio between the Si element source and the alkali source, a $M_{(2/n)}O/SiO_2$ (M represents an alkali metal or an alkaline earth metal, and n represents the valence thereof, which is 1 or 2) molar ratio is typically 0.02 or more, preferably 0.04 or more, and more preferably 0.05 or more, and typically 0.5 or less, preferably 0.4 or less, and more preferably 0.3 or less.

When a CHA-type zeolite membrane is formed, it is preferable to contain K among alkali metals in view of generating a denser membrane with high crystallinity. In this case, the molar ratio of K to all alkali metals including the K and/or alkaline earth metals is typically 0.01 or more and 1 or less, preferably 0.1 or more and 1 or less, and still more preferably 0.3 or more and 1 or less.

As for the ratio between the Si element source and water, the molar ratio of water to $SiO_2$ ($H_2O/SiO_2$ molar ratio) is typically 10 or more, preferably 30 or more, more preferably 40 or more, and particularly preferably 50 or more, and typically 1000 or less, preferably 500 or less, more preferably 200 or less, and particularly preferably 150 or less.

When the molar ratio of the substances in the aqueous reaction mixture is in the ranges, a dense zeolite membrane can be generated. The amount of water is particularly important for generating a dense zeolite membrane. A condition that a large amount of water exists with respect to silica tends to more easily result in production of a dense membrane than the common conditions of a powder synthesis method.

As for the amount of water in the case of synthesizing a powdery CHA-type zeolite, the $H_2O/SiO_2$ molar ratio is commonly around 15 to 50. A zeolite membrane composite having high separation performance in which a CHA-type zeolite is crystallized in the form of a dense membrane on a support can be obtained by setting a condition that the $H_2O/SiO_2$ molar ratio is high (50 or more and 1000 or less), i.e., a large amount of water exists.

Further, the crystallization of the zeolite on the support can be promoted by adding a seed crystal although it is not necessary to allow the seed crystal to exist in a reaction system in hydrothermal synthesis. A method for adding the seed crystal is not particularly limited, but a method of adding a seed crystal into an aqueous reaction mixture, a method of depositing a seed crystal on a support, or the like can be used in a manner similar to that in the synthesis of a powdery zeolite.

It is preferable to deposit a seed crystal on a support when a zeolite membrane composite is produced. Generation of a dense zeolite membrane having favorable separation performance is facilitated by depositing the seed crystal on the support in advance.

Any kind of a seed crystal used is acceptable as long as being a zeolite promoting crystallization, but preferably has the same crystal type as that of a formed zeolite membrane in order to achieve efficient crystallization.

It is preferable to use a seed crystal of a CHA-type zeolite when a CHA-type zeolite membrane is formed.

The particle diameter of a seed crystal is typically 0.5 nm or more, preferably 1 nm or more, and more preferably 2 nm or more, and typically 20 μm or less, preferably 15 μm or less, and more preferably 10 μm or less.

A method for depositing a seed crystal on a support is not particularly limited, but for example, a dip method of dispersing a seed crystal in a solvent such as water and dipping a support in the dispersion liquid to deposit the seed crystal on the support, a method of mixing a seed crystal with a solvent such as water to make a slurry and applying the slurry onto a support, or the like can be used. In view of controlling the amount of the deposited seed crystal and producing a membrane composite with favorable reproducibility, a dip method is desirable.

The solvent in which the seed crystal is dispersed is not particularly limited, but water is particularly preferred.

In the case of forming a zeolite membrane on a support by hydrothermal synthesis, a method for fixation thereof on the support is not particularly restricted, but any form such as a vertical or horizontal form is acceptable. In this case, the zeolite membrane may be formed by a standing method, or the zeolite membrane may be formed by stirring an aqueous reaction mixture.

The temperature in the case of forming the zeolite membrane is not particularly limited, but is typically 100° C. or more, preferably 120° C. or more, and still more preferably 150° C. or more, and typically 200° C. or less, preferably 190° C. or less, and still more preferably 180° C. or less. The excessively low reaction temperature may result in inhibition of crystallization of a zeolite. The excessively high reaction temperature may result in easy generation of a zeolite of which the type is different from the type of the zeolite in the present invention.

The heating time is not particularly limited, but is typically 1 hour or more, preferably 5 hours or more, and still more preferably 10 hours or more, and typically 10 days or less, preferably 5 days or less, more preferably 3 days or less, and still more preferably 2 days or less. The excessively short reaction time may result in inhibition of crystallization of a zeolite. The excessively long reaction time may result in easy generation of a zeolite of which the type is different from the type of the demanded zeolite.

The pressure in the case of forming a zeolite membrane is not particularly limited, but is sufficiently an autogenous pressure occurring when the aqueous reaction mixture put in the airtight container is heated in the temperature range. An inert gas such as nitrogen may be further added as needed.

The zeolite membrane composite obtained by the hydrothermal synthesis is washed with water, then heat-treated, and dried. The heat treatment means that heat is applied to dry the zeolite membrane composite or a template is burnt when the template is used.

In the case of the purpose of drying, the heat treatment temperature is typically 50° C. or more, preferably 80° C. or more, and more preferably 100° C. or more, and typically 200° C. or less, and preferably 150° C. or less. In the case of the purpose of calcining the template, the heat treatment temperature is typically 350° C. or more, preferably 400° C. or more, more preferably 430° C. or more, and still more preferably 480° C. or more, and typically 900° C. or less, preferably 850° C. or less, more preferably 800° C. or less, and still more preferably 750° C. or less.

In the case of the purpose of calcining the template, the excessively low heat treatment temperature tends to result in the increased rate of a remaining organic template, and may cause a small number of pores in a zeolite and may therefore result in a decreased permeation flux in the case of separation and concentration. The excessively high heat treatment temperature results in an increased difference between the thermal expansion coefficients of a support and a zeolite, may therefore cause a zeolite membrane to be easily cracked, and may result in the lost denseness of the zeolite membrane and in the deterioration of separation performance.

The heating time is not particularly limited as long as being a time for which the zeolite membrane is sufficiently dried or the template is burnt, but is preferably 0.5 hour or more and more preferably 1 hour or more. The upper limit thereof is not particularly limited, but is typically 200 hours or less, preferably 150 hours or less, and more preferably 100 hours or less. The heat treatment in the case of the purpose of burning the template may be performed in an air atmosphere, and may be performed in an atmosphere to which an inert gas such as $N_2$, and oxygen are added.

When the hydrothermal synthesis is performed in the presence of an organic template, it is appropriate to wash the obtained zeolite membrane composite with water, and then remove the organic template by, for example, heat treatment, extraction, or the like, preferably by heat treatment, i.e., burning.

It is desirable to minimize the temperature increase rate in the heat treatment for the purpose of burning the template in order to inhibit the difference between the thermal expansion coefficients of the support and the zeolite from causing the zeolite membrane to be cracked. The temperature increase rate is typically 5° C./min or less, preferably 2° C./min or less, still more preferably 1° C./min or less, and particularly preferably 0.5° C./min or less. The temperature increase rate is typically 0.1° C./min or more in consideration of workability.

It is necessary to also control the temperature decrease rate after burning in order to avoid the cracking of the zeolite membrane. Like the temperature increase rate, it is desirable to minimize the temperature decrease rate. The temperature decrease rate is typically 5° C./min or less, preferably 2° C./min or less, more preferably 1° C./min or less, and particularly preferably 0.5° C./min or less. The temperature decrease rate is typically 0.1° C./min or more in consideration of workability.

The zeolite membrane may be ion-exchanged as needed. The ion exchange is typically performed after removal of a template in the case of synthesis by using the template. Examples of ions for the ion exchange include alkali metal ions such as proton, $Na^+$, $K^+$, and $Li^+$; Group 2 element ions such as $Ca^{2+}$, $Mg^{2+}$, $Sr^{2+}$, and $Ba^{2+}$; and ions of transition metals such as Fe, Cu, and Zn. Among them, alkali metal ions such as proton, $Na^+$, $K^+$, and $Li^+$ are preferred.

The ion exchange may be performed by, e.g., a method of treating a zeolite membrane after burning (e.g., in the case of using a template) with an aqueous solution containing an ammonium salt such as $NH_4NO_3$ or $NaNO_3$, or ions to be exchanged, or in some cases, an acid such as hydrochloric acid, typically at a temperature from room temperature to 100° C., and then washing the zeolite membrane with water. The zeolite membrane may be further burnt at 200° C. to 500° C. as needed.

The air permeation amount [$L/(m^2 \cdot h)$] of the zeolite membrane composite obtained in such a manner (heat-treated zeolite membrane composite) is typically 1400 $Lm^2 \cdot h$) or less, preferably 1000 $L/(m^2 \cdot h)$ or less, more preferably 700 $L/(m^2 \cdot h)$ or less, more preferably 600 $L/(m^2 \cdot h)$ or less, still more preferably 500 $L/(m^2 \cdot h)$ or less, particularly preferably 300 $L/(m^2 \cdot h)$ or less, and most preferably 200 $L/(m^2 \cdot h)$ or less. The lower limit of the permeation amount is not particularly limited, but is typically 0.01 $L/(m^2 \cdot h)$ or more, preferably 0.1 $L/(m^2 \cdot h)$ or more, and more preferably 1 $L/(m^2 \cdot h)$ or more.

Herein, the air permeation amount is the permeation amount [L/(m²·h)] of air in the case of connecting the zeolite membrane composite to a vacuum line at an absolute pressure of 5 kPa, as described later.

<Method for Separating Carbon Dioxide>

In a method for separating carbon dioxide according to an embodiment of the present invention, a mixed gas containing carbon dioxide is supplied to a separation membrane module, and the mixed gas is brought into contact with a separation membrane to cause permeation of carbon dioxide in the mixed gas, thereby separating carbon dioxide from the mixed gas.

The mixed gas is not particularly limited as long as being a mixed gas containing carbon dioxide. Representative examples thereof include a mixed gas containing carbon dioxide and methane. In the case of the mixed gas containing carbon dioxide and methane, the mixed gas may contain another gas, and specific examples thereof include (hydrogen sulfide, oxygen, nitrogen, helium, water vapor, olefins such as ethane and propane, olefins such as ethylene and propylene, and aromatic compounds such as benzene and toluene).

The amount of carbon dioxide that can be contained in the mixed gas is not particularly limited, but is typically 3 mol % or more and preferably 5 mol % or more, and typically 90 mol % or less and preferably 80 mol % or less.

The method for separating carbon dioxide according to the embodiment of the present invention is preferably applied to separation of carbon dioxide from a natural gas containing methane and carbon dioxide. In this case, the total amount of methane and carbon dioxide existing in the natural gas is preferably 80 mol % or more, more preferably 85 mol % or more, and still more preferably 90 mol % or more. The natural gas to be subjected to the separation may be a natural gas from which some components are removed by pretreatment after collection of the natural gas, or may be a natural gas of which the pressure is adjusted as needed.

In the method for separating carbon dioxide according to the embodiment of the present invention, the mixed gas is brought into contact with one side of the separation membrane by supplying the mixed gas to the side of the separation membrane, and the pressure of the opposite side thereof is allowed to be lower than that of the side with which the mixed gas comes into contact, thereby allowing carbon dioxide to selectively permeate the separation module including the separation membrane from the mixed gas. As a result, carbon dioxide can be separated from the mixed gas.

When the mixed gas is supplied, the mixed gas is preferably supplied to the separation membrane module at a linear velocity of 1.0 m/s or more, more preferably 1.5 m/s or more, and still more preferably 2.0 m/s or more. According to examination by the present inventors, when the separation performance of a separation membrane was high, for example, when the permeance ratio of carbon dioxide/methane in a case in which a mixed gas contained carbon dioxide and methane was 100 or more, or when the supply pressure of a mixed gas was high (for example, 1 MPaG or more), a low linear velocity resulted in insufficient separation of carbon dioxide. The present inventors consider that as for its cause, the concentration of carbon dioxide in the vicinity of the membrane is decreased because each gas component in the mixed gas in the supply side is insufficiently mixed when the linear velocity is low after carbon dioxide in the vicinity of the membrane permeates the separation membrane. Therefore, it was found that an increase in the linear velocity in the case of supplying the mixed gas allows a gas in the mixed gas supply side of the separation membrane to be sufficiently mixed to increase the concentration of carbon dioxide, thereby enabling carbon dioxide separation performance to be highly maintained.

The upper limit of the linear velocity of the mixed gas is not particularly limited; however, since an increase in linear velocity may cause a physical load to be applied to the separation membrane module, thereby disadvantageously resulting in breakage of the separation membrane module, the upper limit is typically 15 m/s or less, preferably 12 m/s or less, more preferably 10 m/s or less, still more preferably 8.0 m/s or less, and particularly preferably 7.0 m/s or less.

The linear velocity as used herein means is a value determined by the flow rate, pressure, and temperature of an impermeant gas in the separation membrane module, and the cross-sectional area of voids in the separation membrane module, and means the linear velocity of an impermeant gas in the outer portion of the separation membrane. Herein, the voids in the separation membrane module refer to spaces in which the impermeant gas in the separation membrane module can exist (excluding the inside of the zeolite membrane).

From the viewpoint of mixture of the supplied gas described above, the Reynolds number of the supplied mixed gas is preferably 2300 or more, and more preferably 2800 or more. A Reynolds number of 2300 or more means that the flow of the supplied gas is a turbulent flow, and the turbulent flow of the supplied gas causes the supplied gas in the vicinity of the separation membrane module to be sufficiently mixed, thereby increasing the concentration of carbon dioxide and enabling carbon dioxide separation performance to be highly maintained.

The upper limit of the Reynolds number is not particularly limited, but is typically 4050000 or less.

The Reynolds number is defined by the following equation (1). However, in the case of the separation membrane module of the present invention, the separation membrane is arranged in the module (pipe), and therefore it is impossible to simply regard a diameter d as the diameter of the module.

$$Re = \frac{Va \times d}{v} \quad (1)$$

(Va: flow rate [m/s] in pipe, d: diameter [m] of pipe, v: kinematic viscosity [m²/s] (=viscosity/density))

Therefore, the diameter d is regarded as an equivalent diameter De. The equivalent diameter De is a value calculated from the following equation (2):

$$De = 4 \times (\text{area of gas flow passage})/(\text{length of wetted perimeter}) \quad (2)$$

in which the area of a gas flow passage is the cross-sectional area of the inside of a module through which a gas actually flows, and the length of a wetted perimeter is the total sum of the lengths of boundaries with which a gas comes into contact in the cross-sectional area.

From the viewpoint of maintaining high separation performance, the supply pressure of the supplied mixed gas is preferably 1 MPaG or more, more preferably 2 MPaG or more, and still more preferably 3 MPaG or more.

When the supply pressure of the supplied mixed gas is 1 MPaG or more, the separation performance of the separation membrane can be maintained at a high level.

The upper limit of the supply pressure is not particularly limited; however, since an increase in pressure may cause a physical load to be applied to the separation membrane module, thereby disadvantageously resulting in breakage of the separation membrane module, the upper limit is typically 20 MPaG or less.

The flow volume of the mixed gas is not particularly limited, but may be set as appropriate according to a structure in the module and a void area so that a desired linear velocity and a desired Reynolds number are achieved.

<Separation Membrane Module>

Examples of the conceivable forms of separation membrane modules used in separation of a mixed gas include a flat membrane type, a spiral type, a hollow fiber type, a cylindrical type, and a honeycomb type, and an optimal form is selected according to an application target.

A cylindrical separation membrane module which is one of the separation membrane modules will be described with reference to FIG. 1.

FIG. 1 illustrates an embodiment of a separation membrane module that can be used in the method and the apparatus for separating carbon dioxide of the present invention. The separation membrane module includes a cylindrical zeolite membrane composite 1, and the cylindrical zeolite membrane composite 1 is placed in a constant-temperature bath (not illustrated) in the state of being stored in a pressure-resistant container 2 made of stainless steel. In the constant-temperature bath, a temperature control apparatus is disposed so that the temperature of a sample gas can be adjusted.

One end of the cylindrical zeolite membrane composite 1 is sealed with a circular end pin 3. A connection unit 4 is connected to the other end thereof, and the other end of the connection unit 4 is connected to the pressure-resistant container 2. The inside of the cylindrical zeolite membrane composite 1 and a pipe 10 through which a permeate gas 8 is discharged are connected to each other via the connection unit 4, and the pipe 10 extends outside the pressure-resistant container 2. In addition, a pressure gauge 5 that measures the pressure of the sample gas (mixed gas) in a supply side and a back pressure valve 6 that adjusts the pressure in the supply side are connected to any places that communicate with the pressure-resistant container 2. Each connection unit is connected with favorable airtightness.

A mixed gas (supply gas 7) containing carbon dioxide is supplied between the pressure-resistant container 2 and the zeolite membrane composite 1 at a constant flow volume, and the pressure in the supply side is allowed to be constant by the back pressure valve 6. The gas permeates a zeolite membrane according to the difference between the partial pressures of the inside and outside of the zeolite membrane included in the zeolite membrane composite 1, and is discharged through the pipe 10.

A temperature at which a gas is separated from the mixed gas is in a range of 0 to 500° C. The temperature is desirably in a range of room temperature to 100° C. in consideration of the separation properties of the membrane.

In the method for separating carbon dioxide according to the embodiment of the present invention, another element is not particularly limited as long as the method includes the step of supplying the mixed gas to the separation membrane module. The separation apparatus used in the separation method is another embodiment of the present invention, and another element is not particularly limited as long as the apparatus includes at least the separation membrane module. Examples of other elements include a temperature adjustment apparatus, a pressure adjustment apparatus, a thermometer, a pressure gauge, a flow meter, and a gas compression apparatus. Further, only one separation membrane module may be included, or plural separation membrane modules may be included.

EXAMPLES

The present invention will be further specifically described below with reference to Examples. However, the present invention is not limited to the Examples below unless falling outside the gist of the present invention. The values of various production conditions and evaluation results in the Examples below have meanings as the preferred values of upper or lower limits in embodiments of the present invention, and preferred ranges may be ranges defined by the values of the upper or lower limits and the values in the Examples described below or combinations of the values in the Examples.

Test for Separating Mixed Gas

A test for separating a mixed gas was conducted using the apparatus schematically illustrated in FIG. 1, as follows. Sample gases used are two reference gases mixed at molar proportions of $CO_2/CH_4=20/80$ and $CO_2/CH_4=5/95$.

In FIG. 1, the cylindrical zeolite membrane composite 1 is stored in the pressure-resistant container 2 made of stainless steel. In the separation test, the pressure-resistant container 2 is placed in a hot water bath or an oil bath (not illustrated). In the hot water bath or the oil bath, a temperature control apparatus is disposed so that the temperature of the sample gas can be adjusted.

The one end of the cylindrical zeolite membrane composite 1 is sealed with the columnar end pin 3. The connection unit 4 is connected to the other end thereof, and the other end of the connection unit 4 is connected to the pressure-resistant container 2. The inside of the cylindrical zeolite membrane composite 1 and the pipe 10 through which the permeate gas 8 is discharged are connected to each other via the connection unit 4, and the pipe 10 extends outside the pressure-resistant container 2. The pressure gauge 5 that measures the pressure of the sample gas in the supply side is connected to any place that communicates with the pressure-resistant container 2. Each connection unit is connected with favorable airtightness.

When the test for separating a mixed component gas is conducted in the apparatus in FIG. 1, the sample gas (supply gas 7) is supplied between the pressure-resistant container 2 and the zeolite membrane composite 1, the pressure of the sample gas is adjusted using the back pressure valve 6, and the flow volume of the permeate gas 8 that has permeated the zeolite membrane composite is measured with a flow meter (not illustrated) connected to the pipe 10. Further, part of the permeate gas 8 is sampled, and analyzed by gas chromatography to determine the composition of the gas.

More specifically, drying at not less than a measured temperature and purging treatment with an exhaust gas or the supply gas used are performed in order to remove components such as water and air, the temperature of the sample and the difference between the pressures of the sides of the supply gas 7 and the permeate gas 8 in the zeolite membrane composite 1 are allowed to be constant, and the flow volume and gas composition of the sample gas (permeate gas 8) that has permeated the zeolite membrane composite 1 are measured to calculate the permeance [mol·$(m^2 \cdot s \cdot Pa)^{-1}$] of the gas after stabilization of the flow volume of the permeate gas. The difference between the mean value of the partial pressures of the supply gas 7 and a residue gas 9 and the partial pressure of the permeate gas 8 is used as each gas pressure for calculating a permeance.

A permeance ratio can be determined by calculating the proportion of each gas permeance calculated based on the measurement results described above.

Example 1

An inorganic porous support-CHA-type zeolite membrane composite was produced by directly hydrothermal synthesis of a CHA-type aluminosilicate zeolite on an inorganic porous support.

A reaction mixture for hydrothermal synthesis was prepared as follows.

To a mixture of 2.9 g of 1 mol/L-NaOH aqueous solution and 11.5 g of 1 mol/L-KOH aqueous solution, 0.393 g of aluminum hydroxide (containing 53.5 mass % of $Al_2O_3$, manufactured by Aldrich Corporation) was added, stirred, and dissolved, and 228 g of desalted water was further added. To the resultant, 4.9 g of N,N,N-trimethyl-1-adamantane ammonium hydroxide (hereinafter referred to as "TMADAOH") aqueous solution (containing 25 mass % of TMADAOH, manufactured by SACHEM, Inc.) was added as an organic template, and 21.6 g of colloidal silica (SNOWTEX-40, manufactured by Nissan Chemical Industries, Ltd.) was further added, and stirred to make an aqueous reaction mixture.

The composition (molar ratio) of the reaction mixture is $SiO_2/Al_2O_3/NaOH/KOH/H_2O/TMADAOH=1/0.02/0.08/0.1/100/0.04$, $SiO_2/Al_2O_3=70$.

A porous alumina tube (outer diameter of 12 mm, inner diameter of 9 mm) was cut to have a length of 80 mm, then washed with desalted water, and then dried, and the resultant was used as the inorganic porous support.

A CHA-type zeolite obtained by filtration, water washing, and drying of a precipitate generated by hydrothermal synthesis at 160° C. for 2 days under the condition of the presence of a porous alumina tube (outer diameter of 12 mm, inner diameter of 9 mm) in the gel composition (molar ratio) of $SiO_2/Al_2O_3/NaOH/KOH/H_2O/TMADAOH=1/0.066/0.15/0.1/100/0.04$ was used as a seed crystal.

The above-described support was dipped for predetermined time in a liquid obtained by dispersing about 3 mass % of the seed crystal in desalted water, thereby depositing the seed crystal on the support, and the support was then put in a constant-temperature bath, was warmed, and was dried. After the drying, rubbing treatment of rubbing a support surface was further performed. An increase in mass after the rubbing treatment was 3.0 g/m².

The support on which the seed crystal was deposited was vertically dipped in an inner cylinder (200 ml) made of Teflon (registered trademark), in which half of the above-described aqueous reaction mixture was put, an autoclave was sealed, and the support was heated in a standing state under autogenous pressure at 180° C. for 24 hours. After a lapse of a predetermined period of time, the support was allowed to stand for cooling, and a zeolite membrane composite was then taken out of the reaction mixture, put in a constant-temperature bath, warmed, and dried.

The membrane composite was calcined in air in an electric furnace under the conditions of a maximum temperature of 500° C.×5 hours. Both a temperature increase rate and a temperature decrease rate at 150° C. or more in this case were set at 0.5° C./min. The mass of a CHA-type zeolite crystallized on the support, determined from the difference between the masses of the burnt membrane composite and the support, was 86 g/m².

After the calcination, one end of the membrane composite having a cylindrical pipe shape was sealed, the other end thereof was connected to a vacuum line to reduce the pressure of the inside of the pipe, and an air permeation amount was measured with a flow meter placed in the vacuum line. The air permeation amount was 1400 L/(m²·h).

A test for permeation of a mixed gas was conducted using the CHA-type zeolite membrane composite produced as described above. As pretreatment, the zeolite membrane composite was put in an oil bath set at 140° C. in a state in which the zeolite membrane composite was stored in a pressure-resistant container made of stainless steel, and $CO_2$ as the supply gas 7 was introduced at a flow volume of about 100 mL/min between the cylinders of the pressure-resistant container 2 and the zeolite membrane composite 1. The pressure of the supply gas was set at about 0.1 MPaG, and the inside of the cylinder of the zeolite membrane composite 1 was set at 0 MPaG (atmospheric pressure) and dried for about 1 hour. In the meantime, the pressure of the supply gas varies according to the amount of $CO_2$ permeating the membrane.

Then, the temperature of the oil bath was decreased to 40° C., and the supply gas was switched to a reference gas of $CO_2/CH_4=20/80$, which was introduced. The pressure of the supply gas was set at 3.5 MPaG with a back pressure valve. The flow volume of the supply gas was changed in order of 19.7 NL/min, 40.3 NL/min, 81.6 NL/min, 152 NL/min, and 251 NL/min. The Reynolds number at the flow volumes are 723, 1504, 3072, 5744, and 9515, respectively.

The amount of the permeate gas was measured under the condition of each supply gas amount, and part of the permeate gas was further sampled and analyzed by gas chromatography to determine the composition of the gas.

Figure 2:
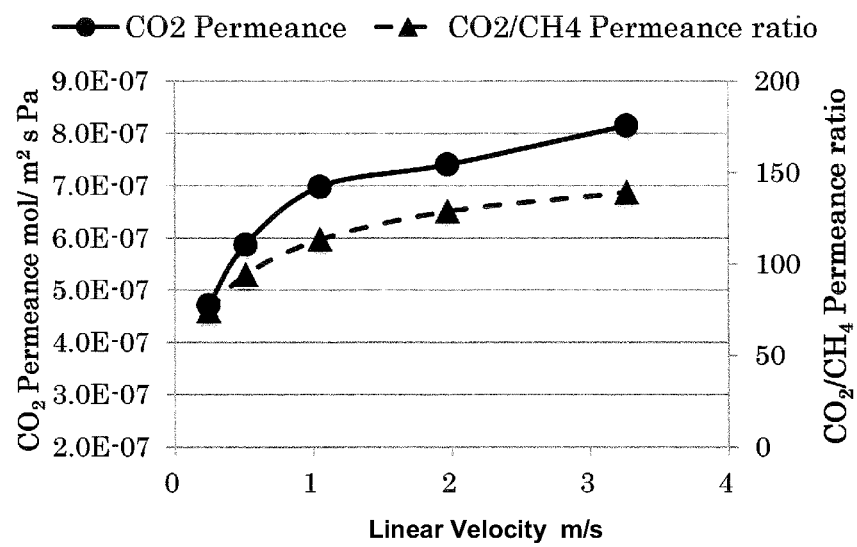
FIG. 2 is a graph illustrating the results of Example 1.

The dependency of a $CO_2$ permeance and a $CO_2/CH_4$ permeance ratio obtained in such a manner on a linear velocity is represented in Table 1 and FIG. 2. The influence of the linear velocity is high at a linear velocity of 1.0 m/s or less while the influence is reduced in the range of a linear velocity of 1.0 m/s or more, and it is revealed that a difference in performance depending on a difference in linear velocity is reduced.

TABLE 1

| Linear velocity (m/s) | Reynolds number | $CO_2$ permeance (mol/m²sPa) | $CO_2/CH_4$ Permeance ratio |
| --- | --- | --- | --- |
| 0.248 | 723 | 4.72 × 10⁻⁷ | 74.1 |
| 0.516 | 1504 | 5.87 × 10⁻⁷ | 94.1 |
| 1.05 | 3072 | 6.98 × 10⁻⁷ | 113 |
| 1.97 | 5744 | 7.41 × 10⁻⁷ | 129 |
| 3.27 | 9515 | 8.15 × 10⁻⁷ | 139 |

Example 2

An inorganic porous support-CHA-type zeolite membrane composite was produced by directly performing hydrothermal synthesis of a CHA-type aluminosilicate zeolite on an inorganic porous support.

A reaction mixture for hydrothermal synthesis was prepared as follows.

To a mixture of 1.5 g of 1 mol/L-NaOH aqueous solution and 5.8 g of 1 mol/L-KOH aqueous solution, 0.196 g of aluminum hydroxide (containing 53.5 mass % of $Al_2O_3$, manufactured by Aldrich Corporation) was added, stirred, and dissolved, and 114 g of desalted water was further added. To the resultant, 2.5 g of N,N,N-trimethyl-1-adamantane ammonium hydroxide (hereinafter referred to as "TMADAOH") aqueous solution (containing 25 mass % of TMADAOH, manufactured by SACHEM, Inc.) was added as an organic template, 10.8 g of colloidal silica (SNOWTEX-40, manufactured by Nissan Chemical Industries, Ltd.) was further added, and 0.025 g of a CHA-type zeolite was further added, and stirred to make an aqueous reaction mixture.

The composition (molar ratio) of the reaction mixture excluding a seed crystal is similar to the composition in Example 1.

Then, a seed crystal was deposited in the same manner as that in Example 1 except that the concentration of the seed crystal was set at 3 wt %. An increase in mass after rubbing treatment was 1.4 g/m$^2$.

A total amount of the above-described aqueous reaction mixture described above was further put in an inner cylinder (200 ml) made of Teflon (registered trademark), and a membrane was produced and burnt to measure an air permeation amount in a manner similar to that in Example 1. The mass of a CHA-type zeolite crystallized on the support was 116 g/m$^2$, and the air permeation amount was 271 L/(m$^2$·h).

A test for permeation of a mixed gas was conducted using the CHA-type zeolite membrane composite produced as described above. As pretreatment, the zeolite membrane composite was put in a constant-temperature bath warmed to 140° C. in a state in which the zeolite membrane composite was stored in a pressure-resistant container made of stainless steel, N$_2$ as the supply gas 7 was introduced at 10 mL/min between the cylinders of the pressure-resistant container 2 and the zeolite membrane composite 1, and drying was performed for 1 hour.

Then, the zeolite membrane composite was taken out of the inside of the constant-temperature bath and put in a hot water bath of which the temperature was adjusted to 40° C., and a reference gas of CO$_2$/CH$_4$=5/95 was supplied. The pressure of the supply gas was set at 3.5 MPaG with a back pressure valve. The flow volume of the supply gas was changed in order of 37 NL/min, 74 NL/min, 148 NL/min, and 221 NL/min. The Reynolds number at the flow volumes are 1401, 2803, 5604, and 8370, respectively.

Then, the pressure of the supply gas was set at 5.0 MPaG with the back pressure valve. The flow volume of the supply gas was changed in order of 53 NL/min, 105 NL/min, 211 NL/min, and 316 NL/min. The Reynolds number at the flow volumes are 2007, 4059, 7992, and 11967, respectively.

The amount of the permeate gas was measured under the conditions of each pressure and each supply gas amount, and part thereof was further sampled and analyzed by gas chromatography to determine the composition of the gas.

Figure 3:
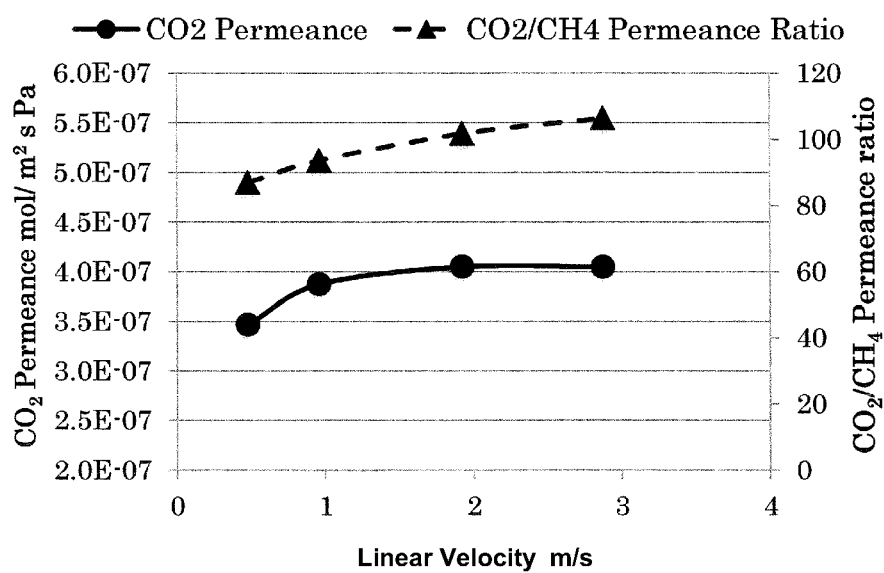
FIG. 3 is a graph illustrating the results of Example 2.
Figure 4:
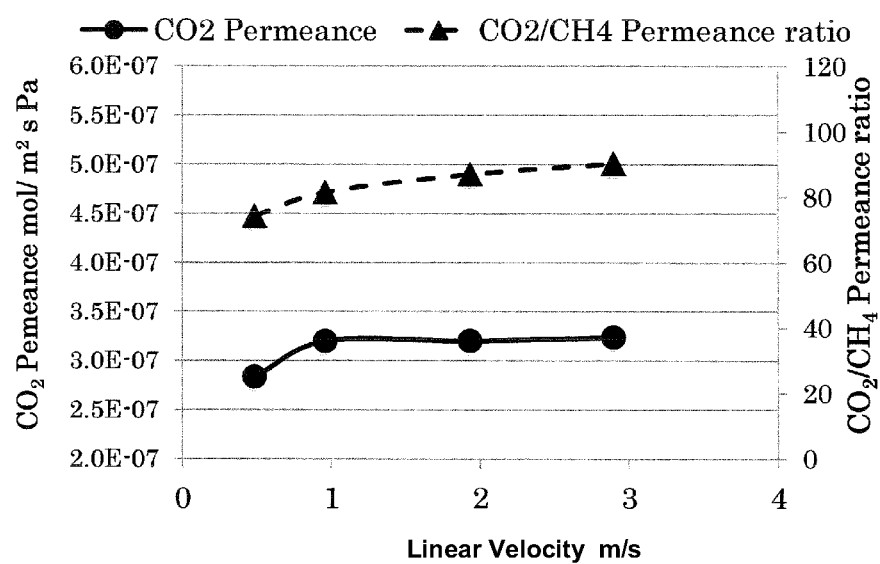
FIG. 4 is a graph illustrating the results of Example 2.

The dependency of a CO$_2$ permeance and a CO$_2$/CH$_4$ permeance ratio obtained in such a manner on a linear velocity is represented in Table 2, FIG. 3 (3.5 MPaG), Table 3, and FIG. 4 (5.0 MPaG). The CO$_2$ permeance is greatly influenced by the linear velocity at a linear velocity of 1.0 m/s or less but is less influenced in the range of a linear velocity of 1.0 m/s or more, and it is revealed that a difference in performance depending on a difference in linear velocity is reduced.

TABLE 2

| Linear velocity (m/s) | Reynolds number | CO$_2$ permeance (mol/m$^2$sPa) | CO$_2$/CH$_4$ Permeance ratio |
|---|---|---|---|
| 0.481 | 1401 | 3.46 × 10$^{-7}$ | 86.9 |
| 0.962 | 2803 | 3.87 × 10$^{-7}$ | 93.6 |
| 1.92 | 5604 | 4.05 × 10$^{-7}$ | 102 |

TABLE 2-continued

| Linear velocity (m/s) | Reynolds number | CO$_2$ permeance (mol/m$^2$sPa) | CO$_2$/CH$_4$ Permeance ratio |
|---|---|---|---|
| 2.87 | 8370 | 4.05 × 10$^{-7}$ | 106 |

TABLE 3

| Linear velocity (m/s) | Reynolds number | CO$_2$ permeance (mol/m$^2$sPa) | CO$_2$/CH$_4$ Permeance ratio |
|---|---|---|---|
| 0.486 | 2007 | 2.83 × 10$^{-7}$ | 74.2 |
| 0.963 | 4059 | 3.20 × 10$^{-7}$ | 81.4 |
| 1.94 | 7992 | 3.20 × 10$^{-7}$ | 87.0 |
| 2.90 | 11967 | 3.24 × 10$^{-7}$ | 90.3 |

Reference Example

A test for permeation of a mixed gas was conducted using a CHA-type zeolite membrane composite produced in a manner similar to that in Example 1. As pretreatment, the zeolite membrane composite was put in a constant-temperature bath set at 50° C. in a state in which the zeolite membrane composite was stored in a pressure-resistant container made of stainless steel, and CO$_2$ as the supply gas 7 was introduced at a flow volume of about 500 mL/min between the cylinders of the pressure-resistant container 2 and the zeolite membrane composite 1. The pressure of the supply gas was set at about 0.1 MPaG, and the inside of the cylinder of the zeolite membrane composite 1 was set at 0 MPaG (atmospheric pressure) and dried for about 1 hour.

Then, the temperature of the constant-temperature bath was decreased to 40° C., and the supply gas was switched to a reference gas of CO$_2$/CH$_4$=50/50, which was introduced. The pressure of the supply gas was set at 0.3 MPaG with a back pressure valve. The flow volume of the supply gas was changed in order of 0.25 NL/min, 0.49 NL/min, 0.98 NL/min, 1.48 NL/min, 1.97 NL/min, 2.46 NL/min, 2.95 NL/min, 3.88 NL/min, and 4.92 NL/min. The Reynolds number at the flow volumes are 4.1, 8.1, 16.1, 24.2, 32.3, 40.3, 48.3, 64.5, and 80.6, respectively.

The amount of the permeate gas was measured under the condition of each supply gas amount, and part of the permeate gas was further sampled and analyzed by gas chromatography to determine the composition of the gas.

Figure 5:
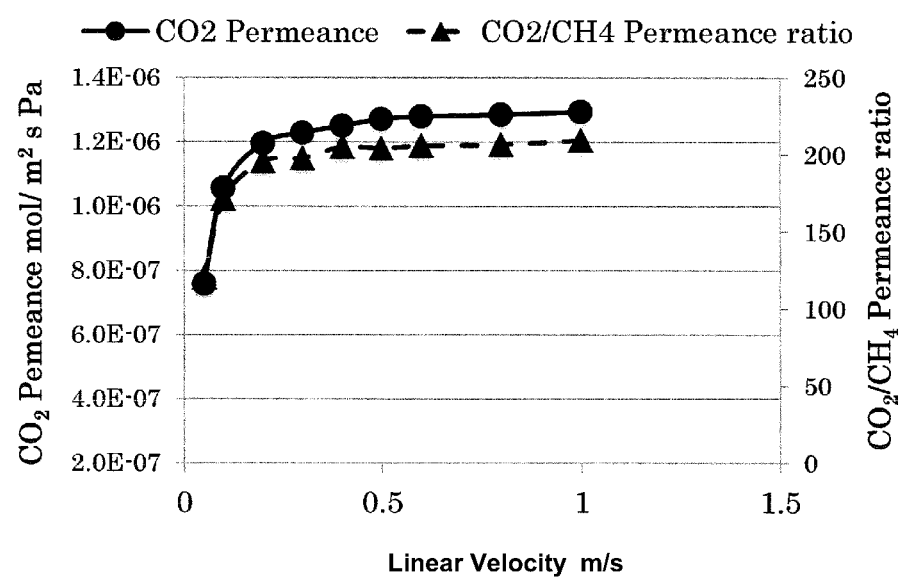
FIG. 5 is a graph illustrating the results of Reference Example.

The dependency of a CO$_2$ permeance and a CO$_2$/CH$_4$ permeance ratio obtained in such a manner on a linear velocity is represented in FIG. 5. The influence of the linear velocity is high at a linear velocity of 0.2 m/s or less while the influence is reduced in the range of a linear velocity of 1.0 m/s or more, and it is revealed that a difference in performance depending on a difference in linear velocity is reduced. In other words, it is revealed that a linear velocity of 1.0 m/s or more is not necessary under the condition of a low Reynolds number.

While the invention has been described in detail and with reference to specific embodiments thereof, it will be apparent to one skilled in the art that various changes and modifications can be made therein without departing from the spirit and scope thereof.

REFERENCE SIGNS LIST

1 Zeolite membrane composite
2 Pressure-resistant container

3 End pin
4 Connection unit
5 Pressure gauge
6 Back pressure valve
7 Supply gas
8 Permeate gas
9 Sweep gas
10 Pipe

What is claimed is:

1. A method for separating carbon dioxide, the method comprising supplying a mixed gas to a separation membrane module to separate carbon dioxide from the mixed gas,
   wherein the separation membrane module comprises an inorganic separation membrane as a separation membrane,
   the inorganic separation membrane has a permeance ratio of 100 or more and 500 or less between carbon dioxide and methane, measured at 50° C., a supply side gas pressure of 0.1 MPaG, and a permeation side gas pressure set at atmospheric pressure, and
   the mixed gas is supplied to the separation membrane module at a Reynolds number of 2300 or more and a linear velocity in a range of from 1.0 mils or more to 8.0 m/s or less.

2. A method for separating carbon dioxide, the method comprising supplying a mixed gas to a separation membrane module to separate carbon dioxide from the mixed gas,
   wherein the separation membrane module comprises an inorganic separation membrane as a separation membrane,
   the inorganic separation membrane has a permeance ratio of 100 or more and 500 or less between carbon dioxide and methane, measured at 50° C., a supply side gas pressure of 0.1 MPaG, and a permeation side gas pressure set at atmospheric pressure, and
   the mixed gas is supplied to the separation membrane module at a linear velocity in a range of from 1.0 m/s or more to 8.0 m/s or less.

3. The method of claim 1, wherein a supply pressure of the mixed gas is 1 MPaG or more.

4. The method of claim 1, wherein the inorganic separation membrane is a zeolite separation membrane.

5. The method of claim 2, wherein the inorganic separation membrane is a zeolite separation membrane.

6. The method of claim 2, wherein a supply pressure of the mixed gas is 1 MPaG or more.

7. The method of claim 1, wherein the mixed gas comprises methane.

8. The method of claim 2, wherein the mixed gas comprises methane.

9. The method of claim 1, wherein a total amount of methane and carbon dioxide in the mixed gas is 80 mol % or more.

10. The method of claim 2, wherein a total amount of methane and carbon dioxide in the mixed gas is 80 mol % or more.

11. The method of claim 1, wherein a total amount of carbon dioxide in the mixed gas is 3 mol % or more.

12. The method of claim 2, wherein a total amount of carbon dioxide in the mixed gas is 3 mol % or more.

13. The method of claim 1, wherein a total amount of carbon dioxide in the mixed gas is 5 mol % or more.

14. The method of claim 2, wherein a total amount of carbon dioxide in the mixed gas is 5 mol % or more.

15. The method of claim 1, wherein the linear velocity is in a range of from 1.0 m/s or more to 7.0 m/s or less.

16. The method of claim 2, wherein the linear velocity is in a range of from 1.0 m/s or more to 7.0 m/s or less.

17. The method of claim 1, wherein the inorganic separation membrane has a permeance ratio of 140 or more and 500 or less between carbon dioxide and methane, measured at 50° C., a supply side gas pressure of 0.1 MPaG, and a permeation side gas pressure set at atmospheric pressure.

18. The method of claim 2, wherein the inorganic separation membrane has a permeance ratio of 140 or more and 500 or less between carbon dioxide and methane, measured at 50° C., a supply side gas pressure of 0.1 MPaG, and a permeation side gas pressure set at atmospheric pressure.

* * * * *